United States Patent Office 3,752,804
Patented Aug. 14, 1973

---

3,752,804
2-ALLYLOXYINOSINE-5'-PHOSPHATE AND PHYSIOLOGICALLY ACCEPTABLE SALTS THEREOF
Kin-Ichi Imai, Yoshio Yoshioka, Jun Toda, and Hisashi Aoki, Osaka, Japan, assignors to Takeda Chemical Industries, Ltd., Osaka, Japan
No Drawing. Filed June 10, 1970, Ser. No. 45,223
Claims priority, application Japan, June 14, 1969, 44/47,139; June 21, 1969, 44/49,179
Int. Cl. C07d 51/54
U.S. Cl. 260—211.5 R        5 Claims

---

ABSTRACT OF THE DISCLOSURE

A 2-allyloxyinosine-5'-phosphate and a physiologically acceptable salt thereof have excellent ability for improving and/or enhancing the flavor of foods and beverages. Moreover, there is a significant synergistic action between these compounds and monosodium glutamate. Also provided are novel starting materials for preparing these compounds.

---

This invention relates to a novel seasoning compound and compositions, a method for preparing such compound and compositions and a method for improving or enhancing the flavor of foods and beverages. This invention also concerns the novel compound to be utilized in preparing the seasoning compounds.

5'-purinenucleotides such as 5'-inosinic acid and 5'-guanylic acid, usually as the disodium salts, have been employed in practice as chemical condiments because of their strong flavor-enhancing effect (see French Pats. Nos. 1,219,220 and 1,255,334).

It has been found that 2-allyloxyinosine-5'-phosphate and a physiologically acceptable salt thereof, which are novel compounds, have a much higher ability to improve or to enhance the flavor of foods or beverages than 5'-inosinic acid and 5'-guanylic acid. 2-allyloxyinosine-5'-phosphate described hereinafter includes a physiologically acceptable salt thereof, unless otherwise noted.

It has further been found that there is a significant synergistic action between 2-allyloxyinosine-5'-phosphate and monosodium glutamate.

It is an object of the present invention to provide the novel compound and novel seasoning compositions prepared therefrom. Another object of the present invention is to provide a method for producing the compound and a method for preparing the seasoning compositions. A further object of the present invention is to provide a method for improving or enhancing the flavor of foods and beverages.

2-allyloxyinosine-5'-phosphate is prepared, for example, by reacting the 2-allyloxyinosine whose both 2'- and 3'-hydroxyl group may be protected by, for example, isopropylidene group, borate complex, with a phosphorylating agent, and subjecting the resultant product to hydrolysis. The phosphorylation and the subsequent hydrolysis may be effected, for example, by either of the following methods:

(A) 2-allyloxy-2',3'-isopropylideneinosine is reacted with a phosphorylating agent. As the phosphorylating agent, there may be employed for example a phosphoric acid halide such as pyrophosphoryl tetrachloride, phosphoryl chloride or partially hydrolyzed phosphoryl chloride. The phosphorylation reaction proceeds smoothly at a temperature of from about −25° to about 30° C., especially from about 0° to about 10° C. When a reaction solvent is required, a conventional organic solvent such as dioxane or pyridine is employed. The hydrolysis of the resultant product is carried out by per se known procedure, for example, by weakening the acidity of the reaction mixture, preferably to about pH 1.5 to 3 with the addition of an alkaline material such as sodium hydroxide or sodium carbonate, and heating the mixture at a temperature of from about 60° C. to about 80° C. for 15 to 60 minutes to give 2-allyloxyinosine-5'-phosphate.

(B) 2-allyloxyinosine is reacted directly with a phosphorylating agent. In this case, employment of phenols, e.g. phenol, cresol and xylenol, or carbonitriles, e.g. acetonitrile and benzonitrile as the reaction solvent, and pyrophosphoryl tetrachloride as the phosphorylating agent, gives optimum results. The reaction proceeds smoothly at a temperature of from about −25° to about 30° C., especially from about 0° to about 10° C. The resultant product is hydrolyzed in a simple conventional manner, for example, by pouring the reaction mixture into water, preferably cool water, to give a 2-allyloxyinosine-5'-phosphate.

2-allyloxyinosine and 2-allyloxy-2',3'-isopropylideneinosine to be employed as the starting materials are novel compounds. They may be prepared, for example, by reacting a 2-halogenoinosine or a 2-halogeno-2',3'-isopropylideneinosine with an alkali allyloxide such as sodium allyloxide, potassium allyloxide and etc. The reaction proceeds smoothly by refluxing in allylalcohol.

For the purpose of this invention, 2-allyloxyinosine-5'-phosphate thus obtained may be employed in the free form or as a physiologically acceptable salt, such as an alkali metal salt (e.g. sodium salt or potassium salt), an alkaline earth metal salt (e.g. calcium salt of magnesium salt), an ammonium salt, or a non-toxic amine salt such as cyclohexylamine salt.

The threshold value in water of calcium 2-allyloxyinosine-5'-phosphate of the present invention, determined by "The Forced Choice Method of Limits" described in American Journal of Psychology, vol. 69, pp. 672–673 is 0.0052%.

The threshold value of 2-allyloxyinosine-5'-phosphate in far lower than that (0.02%) of disodium 5'-inosinate, which illustrates that this compound can be detected at a lower concentration than 5'-inosinic acid. Further, as mentioned hereinbefore, when 2-allyloxyinosine-5'-phosphate is employed in combination with monosodium glutamate, a remarkable synergistic action is exhibited. As clearly shown in tests described hereinafter, in the co-presence of monosodium glutamate, for example, the flavor-enhancing effect of calcium 2-allyloxyinosine-5'-phosphate is about 6.5 times as strong as that of disodium 5'-inosinate.

2-allyloxyinosine-5'-phosphate is characterized by the following excellent properties:

(1) This is an odorless compound, therefore the original flavor of foods is maintained even when this compound is incorporated in the foods.

(2) Not only is this chemically stable but this is stable against phosphatases.

(3) This is non-toxic to mammals.

(4) This can be dissolved in various kinds of edible organic solvents or edible oils and fats.

(5) This can be employed as one of the various kinds of physiologically acceptable salts.

2-allyloxyinosine-5'-phosphate may be added to foods or beverages in a solid state or in a liquid state, i.e. dissolved in water or a palatable and edible organic solvent, e.g. alcohol. In improving or enhancing the flavor of foods or beverages, the foods or beverages are mixed with 2-allyloxyinosine-5'-phosphate, or are impregnated with a solution of 2-allyloxyinosine-5'-phosphate, or the solution is sprinkled over the food. The addition of 2-allyloxyinosine-5'-phosphate is carried out during or after the preparation of the foods or beverages.

Foods or beverages to be seasoned include, for example, fermented foods such as bean paste (Miso), soy sauce, vinegar or sake, paste such as ham, sausage, steamed fish paste (Kamaboko or Chikuwa), meats such as whale meat, poultry meat, pork or beef, noodles such as macaroni, milk and its processed products such as cow milk, condensed milk or cheese, processed vegetables such as tomato juice or canned spinach, and cooked foods such as soups or stews.

In most cases, it is preferable to employ 2-allyloxyinosine-5'-phosphate together with monosodium glutamate, and if desired, other chemical condiments such as disodium 5'-inosinate, disodium 5'-guanylate, sodium aspartate or sodium succinate. The ratio of 2-allyloxyinosine-5'-phosphate to the monosodium glutamate is advantageously from about 1/500 to about 1/5 by weight.

The preparation of the seasoning composition comprising 2-allyloxyinosine-5'-phosphate and monosodium glutamate may be carried out by simple mixing, or by preparing a base material of either 2-allyloxyinosine-5'-phosphate or monosodium glutamate and successively adhering the other component to the base material. If desired, a composition of 2-allyloxyinosine-5'-phosphate and monosodium glutamate, irrespective of whether it is powdery or granular, may be coated with a known coating agent. Aliphatic acid esters of sugars, e.g. sucrose fatty acid ester, gelatin, casein, edible waxes, stearic acid, vegetable proteins, monoglycerides and the like may be used as the coating agent.

The most effective amount of 2-allyloxyinosine-5'-phosphate to be employed varies with the kinds of foods or beverages, but generally from about 0.0002 to 0.02% relative to the weight of the foods or beverages as served is preferable.

In the instant specification and claims, percentages are by weight except in the case where the meaning is clearly otherwise from the context. Parts by volume bear the same relationship to parts by weight as do milliliters to grams. The "probit analysis" employed in the following test is described in Probit Analysis, a Statistical Treatment of the Sigmoid Response Curve published by Cambridge Univ. Press in 1952.

To compare quantitatively the flavor-enhancing effect of 2-allyloxyinosine-5'-phosphate with that of disodium 5'-inosinate, a test as shown in Test 1 was carried out in accordance with the "constant methods" (panel: 25 persons) in which Sample S is a standard sample and the Samples 1 to 5 are variable ones. The concentration of disodium 5'-inosinate equivalent to Sample S in flavor-enhancing effect was determined by the application of the probit analysis to the resulting data.

TEST 1.—SAMPLES AND RESULTS

| Sample: | Sodium chloride, percent | Monosodium glutamate, percent | Calcium 2-allyloxyinosine-5'-phosphate, percent | Disodium 5'-inosinate, percent | Number of persons who judged the flavor of Sample S to be stronger in comparison with Samples 1 to 5 |
|---|---|---|---|---|---|
| S | 1.0 | 0.05 | 0.00057 | | |
| 1 | 1.0 | 0.05 | | 0.00219 | 21 (84%) |
| 2 | 1.0 | 0.05 | | 0.00296 | 18 (72%) |
| 3 | 1.0 | 0.05 | | 0.00400 | 11 (44%) |
| 4 | 1.0 | 0.05 | | 0.00540 | 5 (20%) |
| 5 | 1.0 | 0.05 | | 0.00729 | 2 (8%) |

The probit analysis, when applied to the above-mentioned results, revealed that 0.00057% of calcium 2-allyloxyinosine-5'-phosphate is equivalent to 0.00373% of disodium 5'-inosinate in its flavor-enhancing effect, and therefore that the flavor-enhancing effect of calcium 2-allyloxyinosine-5'-phosphate is about 6.5 times as strong as that of disodium 5'-inosinate.

EXAMPLE 1

10.8 parts by weight of 2',3'-isopropylidene-2-chloroinosine is dissolved into 500 parts by weight of 2 N-sodium allyloxide and refluxed under heating for 3.5 hours. The reaction mixture is poured into 2000 parts by volume of ice water. The mixture is adjusted to pH 7 with glacial acetic acid and concentrated under reduced pressure. The residue is dissolved in chloroform and washed with water and followed by drying with anhydrous calcium chloride. The chloroform layer is distilled off to give 9.8 parts by weight (yield 85%) of 2',3'-O-isopropylidene-2-allyloxyinosine. The product gives a single ultraviolet absorption in thin-layer chromatography (developer: a mixture of chloroform and methanol (5:2 by volume)). 9.8 parts by weight of 2',3'-O-isopropylidene-2-allyloxyinosine obtained above is dissolved in 200 parts by volume of 99% formic acid and kept standing at a room temperature for 16 hours, and the solution is concentrated under reduced pressure. The residue is dissolved in 200 parts by volume of water and the mixture is extracted with 200 parts by volume of chloroform and the aqueous layer is concentrated and dried up under reduced pressure. To the residue is added 20 parts by volume of methanol and the mixture is refluxed under heating for 20 hours, then concentrated. The residue is recrystallized from water to yield colorless needles of 2-allyloxyinosine melting at 190°–193° C. The yield is 3.5 parts by weight (40%).

*Elementary analysis.*—Calculated for $C_{13}H_{16}N_4O_6$ (percent): C, 48.14; H, 4.97; N, 17.28. Found (percent): C, 47.87; H, 5.04; N, 17.29.

$[\alpha]_D^{21} = -17.2°$ (c.=1.0, water).

Ultraviolet absorption:

$\lambda_{max.}^{0.1NHCl}$ 251 m$\mu$ ($\epsilon$ 12,700)

$\lambda_{max.}^{H_2O}$ 249 m$\mu$ ($\epsilon$ 13,300)

$\lambda_{max.}^{0.1NNaOH}$ 261 m$\mu$ ($\epsilon$ 14,500)

$\lambda_{min.}^{0.1NNaOH}$ 227 m$\mu$

To the suspension of 1.3 part by weight of 2-allyloxyinosine obtained above in 120 parts by volume of metacresol is added 4 parts by volume of pyrophosphoryl chloride at 0°–10° C. and the mixture is reacted at the same temperature for 2 hours. The reaction mixture is poured into 600 parts by volume of water and metacresol is eliminated off by extracting with benzene. Adjusting to pH 2 with 2 N-sodium hydroxide, the mixture is absorbed in 14 parts by weight of active carbon. The active carbon is washed with water and material absorbed in the active carbon is extracted with a mixture of ethanol, 28% aqueous ammonia and water (50:2:48). The extracted solution is concentrated to 10 parts by volume, and to the concentrated solution is added 0.515 parts by weight of calcium chloride and 20 parts by volume of ethanol to give 1.4 part by weight of white powder of calcium 2-allyloxyinosine-5'-phosphate.

*Elementary analysis.*—Calculated for $$C_{13}H_{15}N_4O_9PCa \cdot 0.5H_2O$$

(percent): C, 34.62; H, 3.58; N, 12.42; P, 6.88. Found (percent): C, 34.53; H, 4.00; N, 12.21; P, 6.94.

Ultraviolet absorption:

$\lambda_{max.}^{0.1NHCl}$ 250 m$\mu$ ($\epsilon$ 10,200)

$\lambda_{min.}^{0.1NHCl}$ 220 m$\mu$ $\lambda_{max.}^{H_2O}$ 247 m$\mu$ ($\epsilon$ 10,700), 260 m$\mu$ (shoulder)

$\lambda_{min.}^{H_2O}$ 219 m$\mu$ $\lambda_{max.}^{0.1NNaOH}$ 259 m$\mu$ ($\epsilon$ 11,800)

$\lambda_{min.}^{0.1NNaOH}$ 226 m$\mu$

The product gives a single ultraviolet absorption spot at a migration distance of 1.4 times that of 2-allyloxy-inosine in paper electrophoresis (0.05 M sodium borate buffer, pH 9.2) and gives a single ultraviolet absorption spot at Rf 0.45 in paper chromatography (developer: a mixture of isobutyric acid, 0.5 N-ammonia (10:6 by volume), ascending method).

To a suspension of 1.4 part by weight of this product in 100 parts by volume of water there is added 10 parts by volume of Na+ type of Amberlite IR-120 (trademark) and kept standing while stirring at room temperature for 30 minutes. The resin is removed from the mixture and the resulting solution is subjected to evaporation to dryness. The resultant residue is recrystallized from a solution of water and methanol to give crystals of disodium 2-allyloxyinsine-5'-phosphate.

EXAMPLE 2

1.0 part by weight of disodium 2 - allyloxyinosine-5'-phosphate, 1,000 parts by weight of table salt, 600 parts by weight of sugar, 30 parts by weight of citric acid, 200 parts by weight of hydrolyzed vegetable protein, 300 parts by weight of monosodium glutamate, 2 parts by weight of onion powder, 2 parts by weight of white pepper and 100 parts by weight of vegetable shortening are homogeneously mixed to give about 2,000 parts by weight of powdery soup composition.

1 part by weight of this composition is dissolved in 50 parts by volume of hot water to give a flavor-enhanced soup.

EXAMPLE 3

To 2,000 parts by weight of powdered monosodium glutamate is gradually added a solution of 60 parts by weight of calcium 2-allyloxyinsine-5'-phosphate in 150 parts by volume of water. The mixture is kneaded, granulated, dried and sieved to give a granular seasoning composition.

This composition has excellent ability to enhance and improve the flavor of, for example cream soup, when added thereto in the range of from about 0.05 to about 0.2% by weight.

EXAMPLE 4

To 8,000 parts by weight of fish paste containing 80% of water are added 250 parts by weight of sodium chloride, 30 parts by weight of monosodium glutamate and 1.0 part by weight of disodium 2-allyloxyinsine-5'-phosphate and the mixture is kneaded. To the mixture there is added 1,000 parts by weight of lard, 350 parts by weight of potato starch and 400 parts by weight of wheat starch and the whole mixture is mingled thoroughly. The resultant paste is packed in a casing. The resultant raw fish sausages are boiled at 85° to 90° C. for 1 hour to give flavor-enhanced fish sausages.

EXAMPLE 5

Raw soy sauce prepared by the conventional method is sterilized. To 2,000 parts by volume of the thus treated soy sauce, there is uniformly added 0.2 part by weight of calcium 2-allyloxyinsine-5'-phosphate to give a flavored-enhanced soy sauce.

EXAMPLE 6

1.0 part by weight of disodium 2 - allyloxyinsine-5'-phosphate, 1,200 parts by weight of table salt, 250 parts by weight of sugar, 70 parts by weight of citric acid, 200 parts by weight of hydrolyzed vegetable protein, 300 parts by weight of monosodium glutamate, 10 parts by weight of onion powder, 5 parts by weight of garlic powder, 10 parts by weight of powdered carrot, 5 parts by weight of powdered celery and 5 parts by weight of white pepper are homogeneously mixed to give about 2,000 parts by weight of powdery soup composition.

1 part by weight of this composition is dissolved in 50 parts by volume of hot water to give a flavor-enhanced clear soup.

EXAMPLE 7

1.0 part by weight of calcium 2-allyloxyinosine-5'-phosphate, 1,000 parts by weight of table salt, 450 parts by weight of sugar, 200 parts by weight of hydrolyzed vegetable protein, 400 parts by weight of monosodium glutamate, 20 parts by weight of curry powder, 3,000 parts by weight of skimmed milk powder, 40 parts by weight of powdered butter and 5,000 parts by weight of powdered roux are homogeneously mingled to give powdery soup composition.

1 part by weight of this composition is dissolved in 10 parts by volume of water, followed by boiling for 5 minutes to give a flavor-enhanced curry cream soup.

EXAMPLE 8

9,000 parts by weight of table salt is charged into a fluidizing coating apparatus. The temperature of the blowing air is between 120° and 150° C. A solution of 8 parts by weight of disodium 2-allyloxyinosine-5'-phosphate and 992 parts by weight of monosodium glutamate in 2,000 parts by volume of water is applied to the fluidizing table salt in a tower by spraying the solution uniformly over the salt. The water is evaporated rapidly with the blowing air to give flavor-enhanced table salt.

EXAMPLE 9

Bean paste (Miso) prepared by the conventional method is heated at 85° to 90° to inactivate phosphatase therein. To 10,000 parts by weight of the thus treated bean paste is uniformly added a solution of 0.6 part by weight of calcium 2-allyloxyinosine-5'-phosphate in 100 parts by volume of water to give a flavor-enhanced bean paste.

EXAMPLE 10

To 100,000 parts by volume of Worcestershire sauce prepared by the conventional method is uniformly added 10 parts by weight of disodium 2-allyloxyinosine-5'-phosphate to give a flavor-enhanced Worcestershire sauce.

EXAMPLE 11

Raw tomato juice is prepared by the conventional method. To 10,000 parts by volume of the tomato juice are added 120 parts by weight of sugar, 50 parts by weight of table salt, 10 parts by weight of monosodium glutamate and 0.02 part by weight of disodium 2-allyloxy-inosine-5'-phosphate and the mixture is sterilized to give a flavor-enhanced tomato juice.

What is claimed is:

1. 2-allyloxyinosine-5'-phosphate or a non-toxic physiologically acceptable salt thereof.
2. 2-allyloxyinosine-5'-phosphate according to claim 1, wherein the non-toxic physiologically acceptable salt is the calcium salt.
3. 2-allyloxyinosine-5'-phosphate according to claim 1, wherein the non-toxic physiologically acceptable salt is the sodium salt.
4. 2-allyloxyinosine.
5. 2-allyloxy-2',3'-isopropylideneinosine.

References Cited

UNITED STATES PATENTS

| | | | |
|---|---|---|---|
| 3,114,751 | 12/1963 | Whetstone | 260—211.5 R |
| 3,408,206 | 10/1968 | Yamazaki et al. | 260—211.5 R |
| 3,644,331 | 2/1972 | Marumoto et al. | 260—211.5 R |

LEWIS GOTTS, Primary Examiner

J. R. BROWN, Assistant Examiner

U.S. Cl. X.R.

99—140 N